United States Patent

[11] 3,625,912

| [72] | Inventors | Gerald G. Vincent<br>Barrington;<br>Thomas E. Anderson, Palatine, both of Ill. |
|---|---|---|
| [21] | Appl. No. | 747,799 |
| [22] | Filed | July 26, 1968 |
| [45] | Patented | Dec. 7, 1971 |
| [73] | Assignee | DeSota, Inc.<br>Des Plaines, Ill. |

[54] POLYIMIDE LACQUERS
12 Claims, No Drawings

[52] U.S. Cl. .................................................. 260/30.2,
260/32.6, 260/78
[51] Int. Cl. .......................................... C08g 51/26,
C08g 51/44, C08g 20/32

[50] Field of Search ........................................... 260/30.2,
78 TF, 32.6 N

[56] References Cited
UNITED STATES PATENTS
3,406,148  8/1968  Sambeth et al. ............... 260/47

*Primary Examiner*—Morris Liebman
*Assistant Examiner*—Richard Zaitlen
*Attorney*—Dressler, Goldsmith, Clement & Gordon ABSTRACT: A bis-maleimide is reacted with a diprimary amine in organic solvent medium at a temperature of about 150° C. and present in molar proportions of about 1:1 to produce organic solvent-soluble polymers which thermoset on baking.

POLYIMIDE LACQUERS

The present invention relates to polyimide resins which are soluble in certain strong organic solvents so as to be applicable as a lacquer to form, when the solvent is removed by vaporization, flexible coatings which are strongly adherent to metal substrates and which exhibit excellent resistance to elevated temperature exposure in order to provide utility as aircraft coatings, structural coatings and wire coatings. The resins per se are also useful for molding, in high-temperature adhesives and laminates.

Conventional polyimides are generally prepared by the use of a dianhydride and a diamine, i.e., using pyromellitic anhydride and diaminodiphenyl ether. In general, if one were to consider reacting a monoanhydride material with a diamine, a polymer would not be obtained, i.e., phthalic anhydride with a diamine.

In the invention, maleic anhydride is reacted with a diamine to provide a doubly unsaturated bis-maleimide intermediate having the formula::

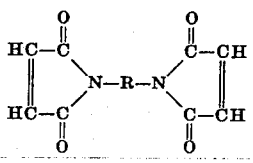

and this bis-maleimide is reacted with additional diamine to provide a polymer in which amine groups link together the maleimide units, the reaction consuming the maleimide unsaturation to produce:

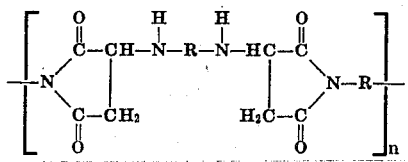

which represents a resinous polymer containing amine and imide linkages in which R identifies the divalent organic radical on which the original diamine was based. Of course, the diamine used to form the maleimide intermediate need not be the same as that used to resinify the intermediate via amine formation.

This type of polyimide is soluble in polar organic solvents such as dimethyl formamide, dimethylacetamide, N-methyl pyrollidone, butyrolactone, etc. whereas polyimides made with pyromellitic dianhydride (PMDA) and diaminodiphenyl ether (DADPE) are not. Diluents may be used to extend the solvent such as cyclohexanone which may also be regarded to be a solvent since it will dissolve the resin after extensive agitation. As a result of the insolubility of conventional polyimides they must be applied to substrates in the polyamic acid form and converted to the polyimide by heat. The conversion of the polyamic acid to polyimide takes place with the elimination of water which causes difficulty when thick sections are cast. The necessity of storing the PMDA-DADPE-type polymer in the polyamic acid form results in stability problems since the polymer appears to undergo a slow cyclization to the insoluble imide. The novel polymers of the invention, being soluble polyimides do not have this problem. Coatings prepared from these new polymers also have exceptional hardness, flexibility, chemical resistance and thermal stability. For example, coatings of these polymers on aluminum panels have withstood reverse impacts of greater than 100 inch-pounds, quite unusual for a polyimide which is normally quite brittle.

Any bis-maleimide may be used since it is the terminal maleic unsaturation which is relied upon for reaction with a diprimary amine to provide polymer growth. The diimide internal structure of the bis-maleimide is entirely inert.

Any $\alpha,\beta$-monoethylenically unsaturated monoanhydride can be used to prepare the bis-maleimide, maleic anhydride being typical. Other anhydrides which may be used are citraconic anhydride, itaconic anhydride and the like.

Any diprimary amine may be used to provide the original bis-maleimide and to later provide the polymeric amine-imide. Obviously, the diprimary amine is preferably free of reactive groups other than amine groups, though it is difficult to conceive of an available diprimary amine which would include an interfering reactive group. The preferred amines are aromatic since these provide the best properties. Particularly useful diamines are as follows: diaminodiphenyl ether (DADPE), diamino diphenyl sulfone, piperazine, 4,4' diamino diphenyl methane (M.D.A.), p-phenylene diamine, 2,4 diamino-6-phenyl-s-triazine (benzoguanamine), polyoxypropylene diamine and bis(4-amino methyl cyclohexane). The use of diamines such as piperazine, diaminodiphenyl sulfone or diaminodiphenyl ether requires careful cooking procedures to avoid gelled products, but these compounds can be used.

A typical reaction in the invention would proceed by dissolving the bis-maleimide in dimethyl acetamide to provide at room temperature a 20 percent by weight solution. The selected diamine is then added to provide a 1:1 molar ratio and the mixture is heated to 150° C. whereupon a reaction takes place and the viscosity builds. The reaction is stopped prior to gelation when a desired viscosity is reached which is normally obtained by simply maintaining the 150° C. temperature for 60-90 minutes. So long as the reaction is stopped before gelation, the flexibility and chemical resistance of the product improves with increasing resinification (higher viscosity).

The polymerization reaction commences at a temperature of about 130° C. and increases in speed with increasing temperature. Preferred conditions are from 145°-160° C., but higher temperatures can be used with increasing control difficulties as the reaction becomes quite rapid. Of course, it is convenient to use a reflux temperature determined by the solvents selected, but pressure can be used to conduct the desired liquid phase reaction at temperatures above the normal boiling point of the solvents selected.

The reaction must be carried out in organic solvent solution. The same reactants are reactive in the absence of solvent, but the bulk reaction proceeds rapidly at relatively low temperature and produces a solvent insoluble product useless in the invention.

The relative molar proportions of bis-maleimide and diamine can vary widely from 5:1 to 1:5, but the higher molecular weight products are preferred, and these are obtained using a molar ratio in the range of 1.5:1 to 1:1.5.

The advantage of using the polyamine-imide resin as a lacquer is the achievement of extreme temperature resistance despite application at very low baking temperature, e.g., 150°-250° F. Usually, weight loss on exposure at 500° F. for 24 hours can be held to 20 percent or less, and even 10 percent or less. This permits large pieces to be coated and high adhesion and flexibility enables use on surfaces which receive impact and vibrational stressing such as the leading edges on aircraft wings. Metal surfaces such as aluminum and titanium as well as the more prosaic ferrous metals and copper can all be coated by the invention. Overcoating with other coatings is also permitted so that primer use is also contemplated. While the aromatic diamines produce the highest melting-point resins, aliphatic diamines such as polyoxypropylene diamine having a molecular weight of from 400-600 lower the melting point and are preferred when molding compositions are intended. In such instance, the resin can be precipitated from the solvent by addition of water.

Typical film thicknesses which can be produced in accordance with the invention by a single coating followed by appropriate baking is from 0.1-0.5 mil. The more usual baking schedules are from 350°-400° F. for from 15-30 minutes, but lower temperatures can be used so long as the solvents are effectively evaporated and higher temperatures are quite satisfactory, though shorter periods of time down to around 30 seconds to 1 minute at 500° F. would be appropriate.

The baked films exhibit considerable hardness, typically 4H or harder, and chemical resistance (to detergents and boiling water) is quite good. These properties are significant especially when they are achieved with good adhesion to a metal substrate as indicated by passing a reverse impact test at 100 inch-pounds. Curiously, the solvent-soluble resins of the invention apparently thermoset when baked. Thus, the resins of the invention prior to baking are easily soluble in dimethyl acetamide, but this solubility disappears on baking at temperatures of 250° F. and higher. The mechanism of cure is not fully understood.

In addition to using the polyamine-imide resin as a lacquer, the resin can be cured through the secondary amino hydrogen atoms by reaction with any polyfunctional material reactive therewith, these being illustrated by organic polyisocycnates, such as toluene diisocyanate, epoxy resins such as the diglycidyl ethers of bisphenol A, and polyaldehydes such as glyoxal. The proportion of curing agent can vary roughly from stoichiometric proportions to 1/10th of such amount.

The invention is illustrated in the examples which follow.

EXAMPLE 1

A flamed out reaction flask was fitted with a stirrer, thermometer, condenser, addition port and a means for maintaining a nitrogen atmosphere. The flask was charged with 60.8 g. of M.D.A. in 250 cc. of freshly distilled dimethyl acetamide. A quantity of 60.2 g. of maleic anhydride was added to the flask followed by a 25 cc. rinse with dimethyl acetamide. The mixture was heated to 150° C. and held there for 50 minutes. During this reaction it was presumed the maleic anhydride reacted with the diamine to form a double-bond-terminated imide "intermediate." After this reaction time the flask was cooled to room temperature, under constant stirring, and 60.8 g. of M.D.A. added to the flask followed by 50 cc. of dimethyl acetamide. The solution was reheated to 150°–155° C. and held there for 90 minutes before cooling and precipitating the polymer in distilled water.

EXAMPLE 2

The "intermediate" for this example was prepared according to the method of example 1 except that 70.95 g. M.D.A. were reacted with 70.2 g. of maleic anhydride in 190 cc. of dimethyl acetamide. Following the preparation of this intermediate 71.6 g. of DADPE were added to the flask with 110 cc. of dimethyl acetamide. The flask was heated to 150°–155° C. and held there for 50 minutes, diluted with 255 cc. of dimethyl acetamide, and finally cooled to room temperature. The polymer was precipitated in benzene and washed with a benzene-ether mixture.

EXAMPLE 3

In this example the "intermediate" was prepared in the same manner as example 1 except that 20.4 g. of DADPS and 16.1 g. of maleic anhydride were reacted in 120 cc. of dimethyl acetamide. In the second stage 16.3 g. of M.D.A. were rinsed into the flask with 25 cc. of dimethyl acetamide, then heated at 150°–160° C. for 2 hours and finally cooled to room temperature.

EXAMPLE 4

The first stage of the reaction in this example was prepared with 20.8 g. of DADPE and 20.4 g. of Maleic anhydride in 140 cc. of dimethyl acetamide by the procedure described in example 1. Following the preparation of this intermediate, 20.8 g. DADPE and 30 cc. of dimethyl acetamide were added to the solution which was then heated to 150° C. and held there for 2½ hours. After cooling to room temperature, the polymer was precipitated in methanol.

EXAMPLE 5

The intermediate in this example was prepared according to the procedure described in example 1. After the solution was cooled to room temperature, a mixture of 6.65 g. of DADPE and 19.8 g. of M.D.A. with 25 cc. of dimethyl acetamide was added to the solution which was then heated to 150° C. and held there for 90 minutes.

EXAMPLE 6

In this example the intermediate was prepared in the same manner as example 1 except that 52.1 g. of bis(4-amino methyl cyclohexane) and 71.8 g. of maleic anhydride in 200 cc. of dimethyl acetamide were employed in the reaction. Following the preparation of the intermediate, 72.6 g. of M.D.A. with 30 cc. of dimethyl acetamide were added to the flask and this mixture heated to 150° C. and held there for 60 minutes.

EXAMPLE 7

The intermediate in this example was prepared by reacting 38.1 g. of polyoxypropylene diamine and 39.3 g. of maleic anhydride in 140 cc. of dimethyl acetamide at a temperature of 150° C. for 2 hours. The second stage of the reaction consisted of 39.9 g. of M.D.A. and 10 cc. of dimethyl acetamide added to the previous solution and heated to 150° C. where it was held for 3 hours.

EXAMPLE 8

In this case the first stage of the reaction consisted of 20.2 g. of p-phenylene diamine reacted with 36.7 g. of maleic anhydride in 220 cc. of dimethyl acetamide at 150° C. for 60 minutes. After cooling the first stage of the reaction to room temperature, 37.1 g. of M.D.A. and 20 cc. of dimethyl acetamide were added to the flask and the mixture heated at 150° C. for 90 minutes.

EXAMPLE 9

The intermediate in this example was prepared by heating 17.0 g. of benzoguanamine and 17.8 g. of maleic anhydride in 140 cc. of dimethyl acetamide at 150° C. for 90 minutes. Following the preparation of the intermediate, the solution was cooled before adding 18.0 g. of M.D.A. and 20 cc. of dimethyl acetamide and then heated to 150° C. and maintained at this temperature for 2 hours.

Coating solutions of the resins described in the forgoing examples were prepared by dissolving each of the resins in a highly polar solvent such as dimethyl formamide, dimethyl acetamide, N-methyl pyrollidone or butyrolactone and diluting this solution with cyclohexanone to spray viscosity. The ratios of cyclohexanone to the other solvent in the spraying solution was about 3:1 and the polymer solids varied in the range of 10–20 percent by weight. These solutions were sprayed under high pressure (about 80 lbs.) The solids content of the solution may be increased by incorporating pigment into the spray solution.

The resins in the examples exhibit a maximum of only 8 percent weight loss after being exposed to forced air at 500° F. for 24 hours.

The spray solutions described above were sprayed on metal panels (iron, aluminum, etc.) and baked for 20 minutes at 400° F. to produce films which were insoluble in the solvents used for application.

The invention is defined in the claims which follow.

We claim:

1. A resinous polymer soluble in polar organic solvent and containing amine and imide groups formed by reacting a bis-maleimide with a diprimary amine in a molar ratio of from 5:1 to 1:5, said reaction being carried out in solution in polar organic solvent temperature of at least about 130° C.

2. A polymer as recited in claim 1 in which the ratio of said bis-maleimide to said diprimary amine is from 1.5:1 to 1:1.5.

3. A polymer as recited in claim 1 in which said maleimide is based on maleic anhydride.

4. A polymer as recited in claim 1 in which said diprimary amine is aromatic.

5. A polymer as recited in claim 1 in which the temperature of reaction is about 150° C.

6. A polymer as recited in claim 1 in which said bis-maleimide is formed by reaction of 2 moles of diprimary aromatic amine with 1 mole of maleic anhydride and additional diprimary aromatic amine is reacted with said bis-maleimide in a molar proportion of substantially 1:1.

7. A lacquer comprising the polymer of claim 1 in solution in a polar organic solvent.

8. A lacquer as recited in claim 7 in which said solvent is selected from the group of dimethyl formamide, dimethylacetamide, N-methyl pyrollidone and butyrolactone.

9. A lacquer as recited in claim 7 in which said solvent is used in admixture with cyclohexanone diluent.

10. A method of forming a resinous polymer soluble in polar organic solvent and containing amine and imide groups comprising reacting a bis-maleimide with a diprimary amine in a molar ratio of from 5:1 to 1:5 in polar organic solvent medium at a temperature of at least about 130° C.

11. A coated product comprising a metal substrate coated with a baked film of the lacquer recited in claim 7.

12. A method of providing a solvent insoluble coating on a metal substrate comprising applying thereto a film of the lacquer recited in claim 7 and then baking said film at a temperature of at least 250° F.

* * * * *

UNITED STATES PATENT OFFICE
CERTIFICATE OF CORRECTION

Patent No. 3,625,912  Dated December 7, 1971

Inventor(s) Gerald G. Vincent and Thomas E. Anderson

It is certified that error appears in the above-identified patent and that said Letters Patent are hereby corrected as shown below:

In the heading, the Assignee should read --DeSoto, Inc.--
Column 3, line 18, "polyisocycnates" should read
--polyisocyanates--. Column 4, claim 1, line 73, after
"solvent" insert --at a--

Signed and sealed this 18th day of July 1972.

(SEAL)
Attest:

EDWARD M. FLETCHER, JR.
Attesting Officer

ROBERT GOTTSCHALK
Commissioner of Patents